US007276961B2

(12) United States Patent
Kimura

(10) Patent No.: US 7,276,961 B2
(45) Date of Patent: Oct. 2, 2007

(54) CONSTANT VOLTAGE OUTPUTTING CIRCUIT

(75) Inventor: Ryohei Kimura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/121,260

(22) Filed: May 3, 2005

(65) Prior Publication Data

US 2005/0280464 A1 Dec. 22, 2005

(30) Foreign Application Priority Data

May 11, 2004 (JP) ............................ 2004-140643

(51) Int. Cl.
*G06F 1/10* (2006.01)
*H01J 19/82* (2006.01)

(52) U.S. Cl. ...................................... 327/538; 327/541

(58) Field of Classification Search ................ 327/530, 327/538–541; 323/311–316
See application file for complete search history.

(56) References Cited

U.S. PATENT DOCUMENTS 6,009,022 A * 12/1999 Lee et al. .............. 365/189.09
6,064,624 A * 5/2000 Pawlowski ............. 365/230.06
6,404,137 B1 * 6/2002 Shodo ...................... 315/169.1
6,509,727 B2 * 1/2003 Fahrenbruch ............... 323/316
6,674,275 B2 * 1/2004 Darzy ........................ 323/316
6,936,998 B2 * 8/2005 Cho ........................... 323/280
6,963,237 B2 * 11/2005 Tamura et al. .............. 327/292

* cited by examiner

*Primary Examiner*—Dinh T. Le
(74) *Attorney, Agent, or Firm*—Adams & Wilks

(57) ABSTRACT

A constant voltage outputting circuit has a differential amplification circuit having two inputs and an output that is connected to a gate of an output transistor. The output transistor is connected between a power supply voltage and an output terminal and controls an output voltage at the output terminal based on an output of the differential amplification circuit. A voltage division resistor divides the output voltage and applies a divided voltage to one input of the differential amplification circuit, and a reference voltage is applied to the other input thereof. A capacitor connected between the power supply voltage and the gate of the output transistor stabilizes the output voltage when the power supply voltage changes.

3 Claims, 4 Drawing Sheets

CONSTANT VOLTAGE OUTPUTTING CIRCUIT

BACKGROUND OF THE INVENTION

1. Field of the Invention

The present invention relates to a constant voltage outputting circuit for stabilizing an output from the power supply when a power supply voltage changes.

2. Description of the Related Art

FIG. 4 is an example of a conventional constant voltage outputting circuit.

An output terminal 411 of a differential amplification circuit 401 having an input terminal connected to a reference voltage VREF is connected to a gate of a PMOS transistor 431 serving as an output transistor. A source terminal of the PMOS transistor 431 is connected to a power supply voltage VDD, and a drain terminal of the PMOS transistor 431 is connected to an output terminal VOUT. One terminal of a resistor 441 is connected to the output terminal VOUT, and the other terminal of the resistor 441 is connected to the other input terminal of the differential amplification circuit 401 and one terminal of a resistor 442, respectively. The other terminal of the resistor 442 is connected to a grounding electric potential VSS.

In the constant voltage outputting circuit constructed as shown in FIG. 4, when an electric potential at a node 422 is lower than the reference voltage VREF, an electric potential at an output terminal 411 of the differential amplification circuit 401 drops, a gate-to-source voltage of the PMOS transistor 431 increases, and hence an output current of the circuit increases. As a result, an electric potential at the output terminal VOUT and an electric potential at the node 422 increase, respectively. On the other hand, when the electric potential at the node 422 is higher than the reference voltage VREF, the electric potential at the output terminal 411 of the differential amplification circuit 401 increases, the gate-to-source voltage of the PMOS transistor 431 decreases, and hence the output current of the circuit decreases. As a result, the electric potential at the output terminal VOUT and the electric potential at the node 422 drop together. Based on this mechanism, the electric potential at the node 422 is stabilized at the same level as that of the electric potential of the reference voltage VREF, and the electric potential at the output terminal VOUT becomes constant in accordance with a resistance value ratio of the resistor 441 to the resistor 442.

When the power supply voltage VDD increases from this stable state, the gate-to-source voltage of the PMOS transistor 431 temporarily increases, the current increases, and hence the electric potential at the output terminal VOUT increases. After that, the electric potential at the node 422 is stabilized at the same level as that of the reference voltage VREF based on the mechanism.

Conversely, when the power supply voltage VDD drops, the gate-to-source voltage of the PMOS transistor 431 temporarily decreases, the current decreases, and hence the electric potential at the output terminal VOUT drops. After that, the electric potential at the node 422 is stabilized at the same level as that of the reference voltage VREF by means of the mechanism.

As means for stabilizing the output from the circuit when the power supply voltage changes in such a constant voltage outputting circuit, there is known a method using means disclosed in JP5-40535A (FIG. 1), for example. However, this method involves a problem in that the number of elements increases.

The problem inherent in the related art will hereinafter be described with reference to FIG. 5. In the conventional constant voltage outputting circuit, when the power supply voltage VDD changes at a point A of FIG. 5, the electric potential at the output terminal 411 of the differential amplification circuit 401, as shown by a dotted line, is stable as it is for a certain time until a point B. Hence, the gate-to-source voltage of the PMOS transistor 431 changes, and thus the current caused to flow through the PMOS transistor 431 changes. As a result, the output voltage at the output terminal VOUT temporarily changes as shown by a dotted line. In the constant voltage outputting circuit, the change of the output voltage value is desirably small, and it is a problem to suppress the change without increasing the number of elements.

SUMMARY OF THE INVENTION

To solve the above-mentioned problem, the present invention adopts a constant voltage outputting circuit that includes a differential amplification circuit having a first input terminal connected to a reference voltage; an output transistor having a source terminal connected to a power supply voltage, a drain terminal connected to an output terminal, and a gate terminal connected to an output terminal of the differential amplification circuit; a first resistor having one end connected to the output terminal, and the other end connected to a second input terminal of the differential amplification circuit; a second resistor having one end connected to the other end of the first resistor and the second input terminal of the differential amplification circuit, and the other end grounded; and a capacitor having one end connected to the power supply voltage, and the other end connected to the output terminal of the differential amplification circuit.

In the present invention, since a gate voltage of the output transistor changes so as to follow the change of the power supply voltage when the power supply voltage changes, a gate-to-source voltage of the output transistor becomes constant, and thus the output voltage becomes stable.

Also, the constant voltage outputting circuit according to the present invention further includes: a differential amplification circuit having a first input terminal connected to a reference voltage; a transistor having a source terminal connected to a power supply voltage, and a gate terminal connected to an output terminal of the differential amplification circuit; a constant current circuit having one end connected to a drain terminal of the transistor, and the other end grounded; an output transistor having a source terminal connected to the power supply voltage, a drain terminal connected to an output terminal, and a drain terminal connected to the drain terminal of the transistor; a first resistor having one end connected to the output terminal, and the other end connected to a second input terminal of the differential amplification circuit; a second resistor having one end connected to the other end of the first resistor and the second input terminal of the differential amplification circuit, and the other end grounded; and a capacitor having one end connected to the power supply voltage, and the other end connected to an output terminal of the output transistor.

Also, the constant voltage outputting circuit according to the present invention further includes: a differential amplification circuit having a first input terminal connected to a reference voltage; a transistor having a source terminal connected to a power supply voltage, and a gate terminal connected to an output terminal of the differential amplification circuit; a constant current circuit having one end connected to a drain terminal of the transistor, and the other end grounded; an output transistor having a source terminal connected to the power supply voltage, a drain terminal connected to an output terminal and a gate terminal connected to the drain terminal of the transistor; a first resistor having one end connected to the output terminal, and the other end connected to a second input terminal of the differential amplification circuit; a second resistor having one end connected to the other end of the first resistor and the second input terminal of the differential amplification circuit, and the other end grounded; and a capacitor having one end connected to the power supply voltage, and the other end connected to a gate terminal of the output transistor.

Also, the constant voltage outputting circuit according to the present invention further includes: a differential amplification circuit having a first input terminal connected to a reference voltage; a transistor having a drain terminal grounded, and a gate terminal connected to an output terminal of the differential amplification circuit; a constant current circuit having one end connected to the power supply voltage, and the other end connected to a source terminal of the transistor; an output transistor having a source terminal connected to the power supply voltage, a gate terminal connected to the source terminal of the transistor, and a drain terminal connected to an output terminal; a first resistor having one end connected to the output terminal, and the other end connected to a second input terminal of the differential amplification circuit; a second resistor having one end connected to the other end of the first resistor and the second input terminal of the differential amplification circuit, and the other end grounded; and a capacitor having one end connected to the power supply voltage, and the other end connected to the output terminal of the differential amplification circuit.

Also, the constant voltage outputting circuit according to the present invention further includes: a differential amplification circuit having a first input terminal connected to a reference voltage; a transistor having a drain terminal grounded, and a gate terminal connected to an output terminal of the differential amplification circuit; a constant current circuit having one end connected to the power supply voltage, and the other end connected to a source terminal of the transistor; an output transistor having a source terminal connected to the power supply voltage, a gate terminal connected to the source terminal of the transistor, and a drain terminal connected to an output terminal; a first resistor having one end connected to the output terminal, and the other end connected to a second input terminal of the differential amplification circuit; a second resistor having one end connected to the other end of the first resistor and the second input terminal of the differential amplification circuit, and the other end grounded; and a capacitor having one end connected to a positive power supply voltage, and the other end connected to a gate terminal of the output transistor.

In the present invention, similarly, since a gate voltage of the output transistor changes so as to follow the change of the power supply voltage when the power supply voltage changes, a gate-to-source voltage of the output transistor becomes constant, and thus the output voltage becomes stable.

Further, the transistor and the output transistor of the constant voltage outputting circuit according to the present invention each include a PMOS transistor.

Further, a capacitance value of the capacitor of the constant voltage outputting circuit according to the present invention is larger than a parasitic capacitance value.

Further, the constant current circuit of the constant voltage outputting circuit according to the present invention includes a PMOS depletion type transistor.

Further, the constant current circuit of constant voltage outputting circuit according to the present invention has a current mirror structure.

In the present invention, with the capacitor which is inserted between the power supply voltage terminal and the terminal and through which the gate electric potential of the output transistor is controlled, when the power supply voltage changes, a gate-to-source voltage of the output transistor is fixed and hence even during the change of the power supply voltage, the stable output can be obtained.

DESCRIPTION OF THE PREFERRED EMBODIMENTS

First Embodiment

Figure 1:
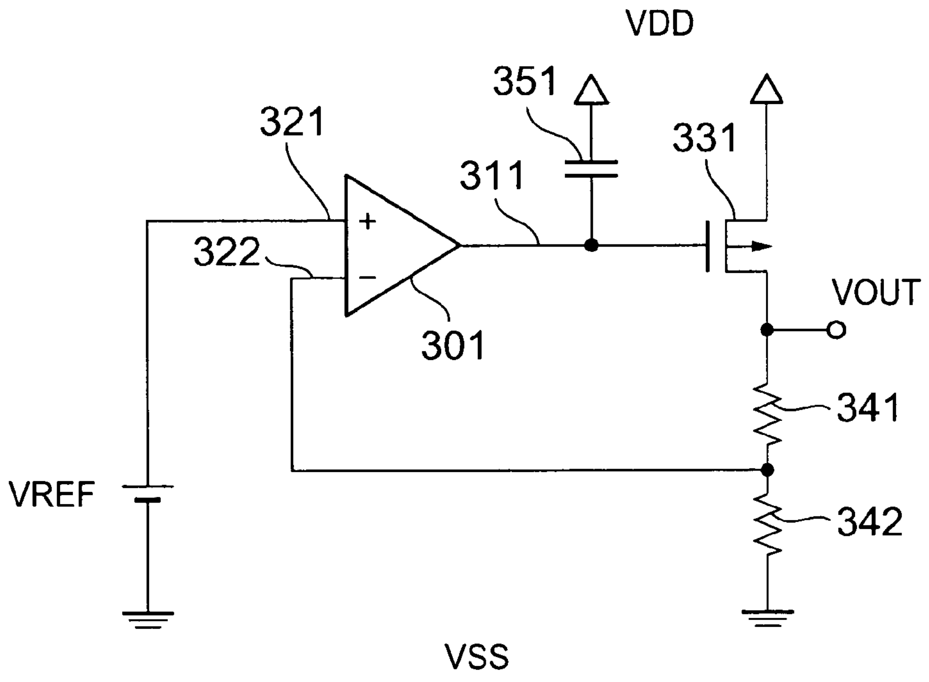
FIG. 1 is a circuit diagram showing a structure of a constant voltage outputting circuit according to a first embodiment of the present invention.

FIG. 1 shows a constant voltage outputting circuit according to a first embodiment of the present invention. The constant voltage outputting circuit is constituted by a two-stage amplification circuit. The constant voltage outputting circuit includes: a differential amplification circuit 301 having a first input terminal 321 to which a reference voltage VREF is inputted; a PMOS transistor 331 serving as an output transistor and having a source terminal connected to a power supply voltage VDD, a drain terminal connected to an output terminal VOUT, and a gate terminal connected to an output terminal 311 of the differential amplification circuit 301; a first resistor 341 having one terminal connected to the output terminal VOUT, and the other terminal connected to a second input terminal 322 of the differential amplification circuit 301; a second resistor 342 having one terminal connected to the other terminal of the first resistor 341 and a second input terminal 322 of the differential amplification circuit 301, and the other terminal grounded to VSS; and a capacitor 351 having one terminal connected to the power supply voltage VDD, and the other terminal connected to the output terminal 311 of the differential amplification circuit 301.

Figure 5:
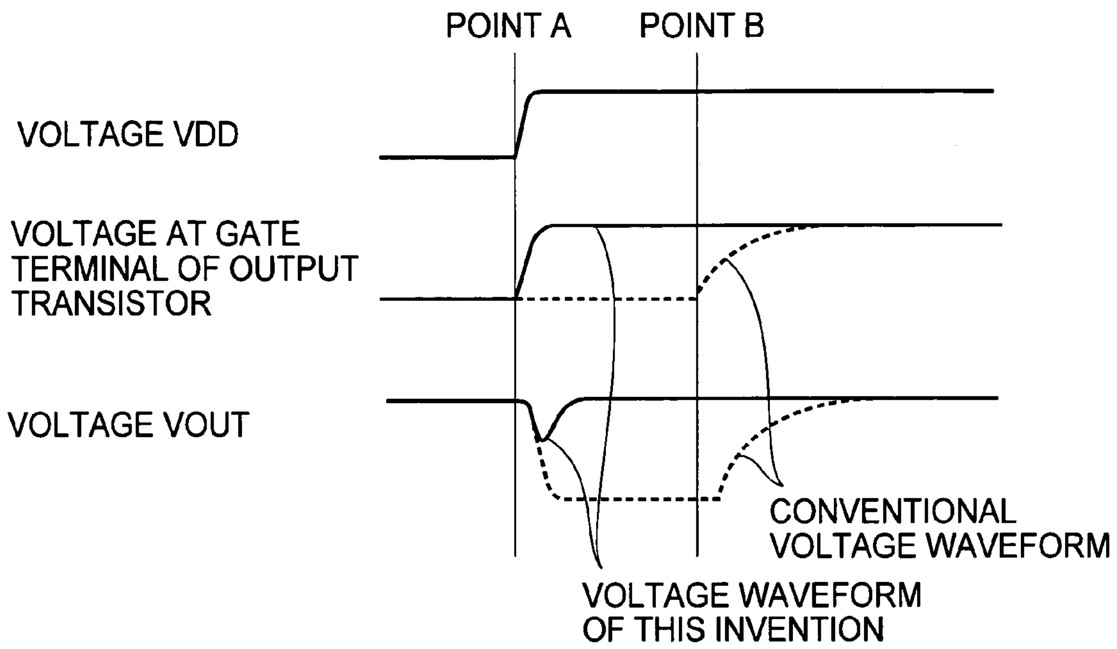
FIG. 5 is a waveform chart explaining an operation of the constant voltage outputting circuit of the present invention and an operation of the conventional constant voltage outputting circuit.

In the constant voltage outputting circuit shown in FIG. 1, when a voltage at the first input terminal 321 and a voltage at the second input terminal 322 are equal to each other, an output voltage at the output terminal 311 of the differential amplification circuit 301 becomes stable, and hence an output voltage at the output terminal VOUT becomes stable. When the power supply voltage VDD changes as shown in FIG. 5, since the electric charges are reserved in the capacitor 351, an electric potential at the output terminal 311 of the differential amplification circuit 301 quickly changes so as to follow the power supply voltage as shown by a solid line of FIG. 5. For this reason, even when the power supply voltage VDD changes, a gate-to-source voltage of the PMOS transistor 331 becomes constant. Thus, the change in output is quickly suppressed as shown by the solid line of FIG. 5, and its change value also becomes small.

Second Embodiment

Figure 2:
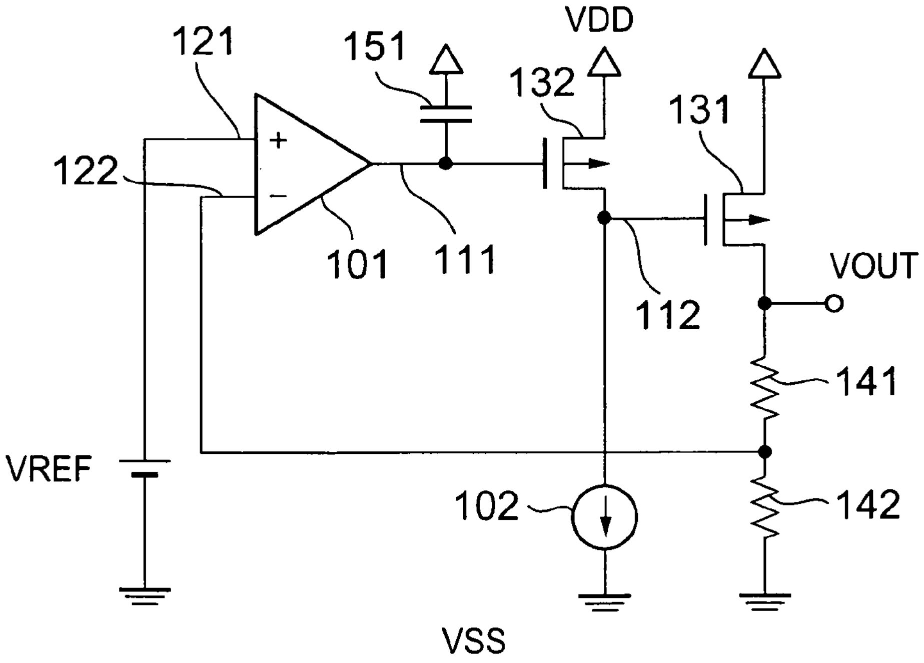
FIG. 2 is a circuit diagram showing a structure of a constant voltage outputting circuit according to a second embodiment of the present invention.

FIG. 2 shows a constant voltage outputting circuit according to a second embodiment of the present invention. The constant voltage outputting circuit is constituted by a three-stage amplification circuit. The constant voltage outputting circuit includes: a differential amplification circuit 101 having a first input terminal 121 to which a reference voltage VREF is inputted; a first PMOS transistor 132 having a source terminal connected to a power supply voltage VDD, and a gate terminal connected to an output terminal 111 of the differential amplification circuit 101; a constant current circuit 102 having one grounded terminal and the other terminal connected to a drain terminal of the first PMOS transistor 132; a second PMOS transistor 131 serving as an output transistor and having a source terminal connected to the power supply voltage VDD, a gate terminal connected to the drain terminal of the first PMOS transistor 132, and a drain terminal connected to an output terminal VOUT; a first resistor 141 having one terminal connected to the output terminal VOUT, and the other terminal connected to a second input terminal 122 of the differential amplification circuit 101; a second resistor 142 having one terminal connected to the other terminal of the first resistor 141 and the second input terminal 122 of the differential amplification circuit 101, and the other terminal grounded to VSS; and a capacitor 151 having one terminal connected to the power supply voltage VDD, and the other terminal connected to the output terminal 111 of the differential amplification circuit 101.

The three-stage amplification circuit having the amplification stage constituted by the first PMOS transistor 132 and the constant current circuit 102 can increase a total gain of the three amplification stages up to a high gain region. Hence, the constant voltage outputting circuit constituted by the three-stage amplification circuit can enhance the ripple rejection ratio characteristics as compared with the constant voltage outputting circuit constituted by the above-mentioned two-stage amplification circuit.

In the constant voltage outputting circuit shown in FIG. 2, when a voltage at the first input terminal 121 and a voltage at the second input terminal 122 are equal to each other, an output voltage at the output terminal 111 of the differential amplification circuit 101 becomes stable, and hence an output voltage at the output terminal VOUT becomes stable. When the power supply voltage VDD changes as shown in FIG. 5, since the electric charges are reserved in the capacitor 151, an electric potential at the output terminal 111 of the differential amplification circuit 101 quickly changes so as to follow the power supply voltage as shown by the solid line of FIG. 5. Moreover, since a constant current is caused to flow from the constant current circuit 102 into the PMOS transistor 132, a gate-to-source voltage of the PMOS transistor 132 becomes constant. Thus, a voltage at the node 112 changes so as to follow the voltage at the output terminal 111, and even when the power supply voltage changes, a gate-to-source voltage of the PMOS transistor 131 becomes constant. As a result, the change in electric potential at the output terminal VOUT can be suppressed to a small level.

Third Embodiment

Figure 3:
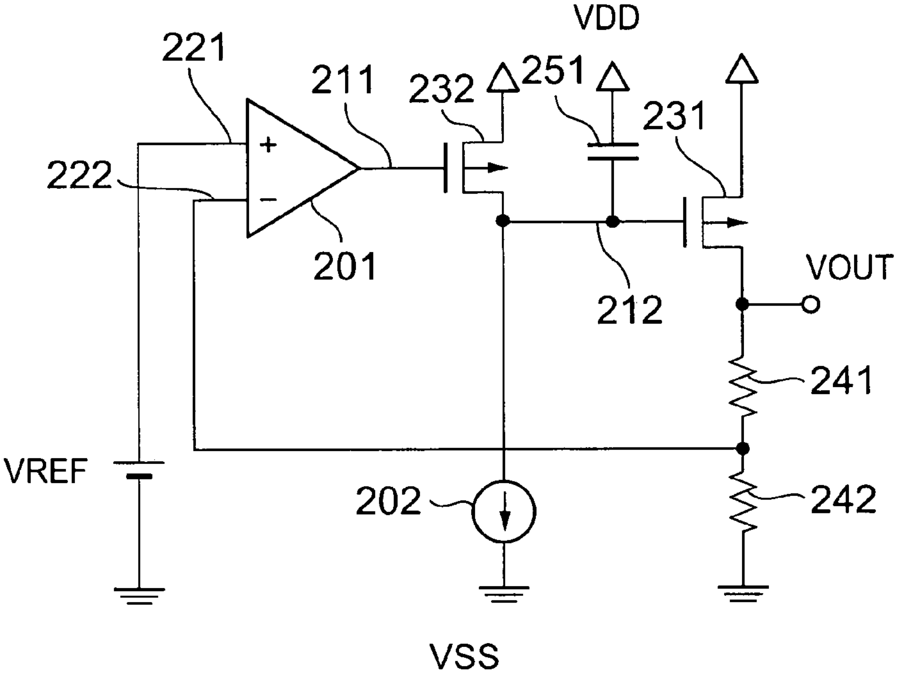
FIG. 3 is a circuit diagram showing a structure of a constant voltage outputting circuit according to a third embodiment of the present invention.
Figure 4:
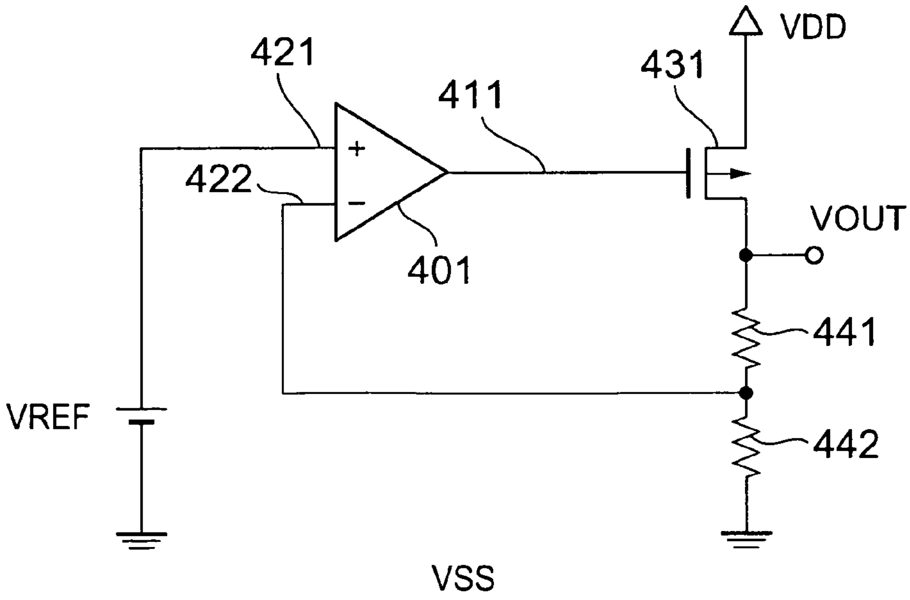
FIG. 4 PRIOR ART
FIG. 4 is a circuit diagram showing a structure of a conventional constant voltage outputting circuit.

FIG. 3 shows a constant voltage outputting circuit according to a third embodiment of the present invention. The constant voltage outputting circuit is constituted by a three-stage amplification circuit. The constant voltage outputting circuit includes: a differential amplification circuit 201 having a first input terminal 221 to which a reference voltage VREF is inputted; a first PMOS transistor 232 having a source terminal connected to a power supply voltage VDD, and a gate terminal connected to an output terminal 211 of the differential amplification circuit 201; a constant current circuit 202 having one grounded terminal and the other terminal connected to a drain terminal of the first PMOS transistor 232; a second PMOS transistor 231 serving as an output transistor and having a source terminal connected to the power supply voltage VDD, a gate terminal connected to the drain terminal of the first PMOS transistor 232, and a drain terminal connected to an output terminal VOUT; a first resistor 241 having one terminal connected to the output terminal VOUT, and the other terminal connected to a second input terminal 222 of the differential amplification circuit 201; a second resistor 242 having one terminal connected to the other terminal of the first resistor 241 and the second input terminal 222 of the differential amplification circuit 201, and the other terminal grounded to VSS; and a capacitor 251 having one terminal connected to the power supply voltage VDD, and the other terminal connected to the gate terminal of the second PMOS transistor 231.

The three-stage amplification circuit having the amplification stage constituted by the first PMOS transistor 232 and the constant current circuit 202 can increase a total gain of the three amplification stages up to a high gain region. Hence, the constant voltage outputting circuit constituted by the constant voltage outputting circuit constituted by the three-stage amplification circuit can enhance the ripple rejection ratio characteristics as compared with the constant voltage outputting circuit constituted by the abovementioned two stage amplification circuit.

In the constant voltage outputting circuit shown in FIG. 3, when a voltage at the first input terminal 221 and a voltage at the second input terminal 222 are equal to each other, an output voltage at the output terminal 211 of the differential amplification circuit 201 becomes stable, and hence an output voltage at the output terminal VOUT becomes stable. When the power supply voltage VDD changes as shown in FIG. 5, since the electric charges are reserved between the mutually opposite terminals of the capacitor 251, an electric potential at the gate terminal 212 of the second PMOS transistor 231 quickly changes so as to follow the power supply voltage VDD. For this reason, even when the power supply voltage VDD chancres, a crate-to-source voltage of the PMOS transistor 231 becomes constant. Thus, the output voltage at the output terminal VOUT does not change.

Fourth and Fifth, Embodiments

Figure 6:
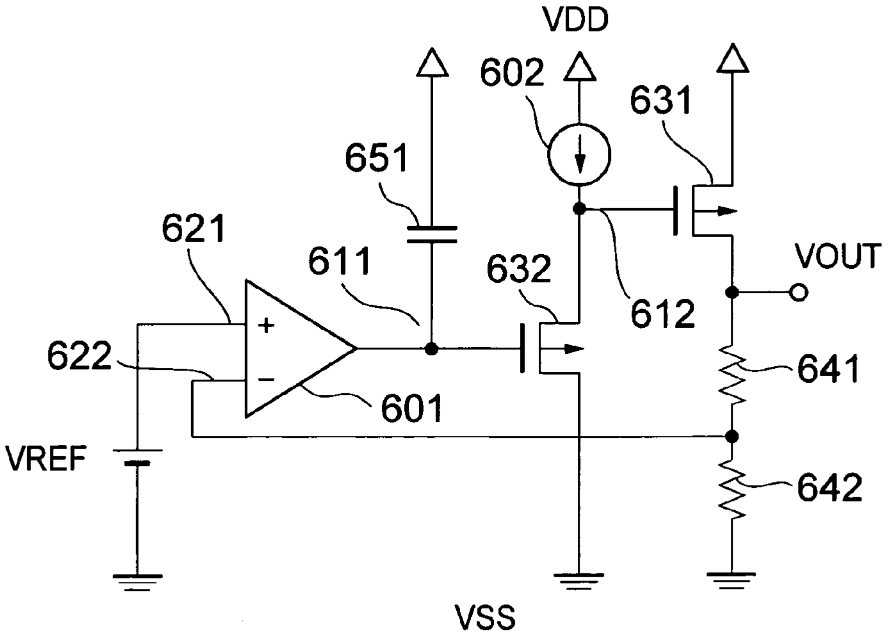
FIG. 6 is a circuit diagram showing a structure of a constant voltage outputting circuit according to a fourth embodiment of the present invention.
Figure 7:
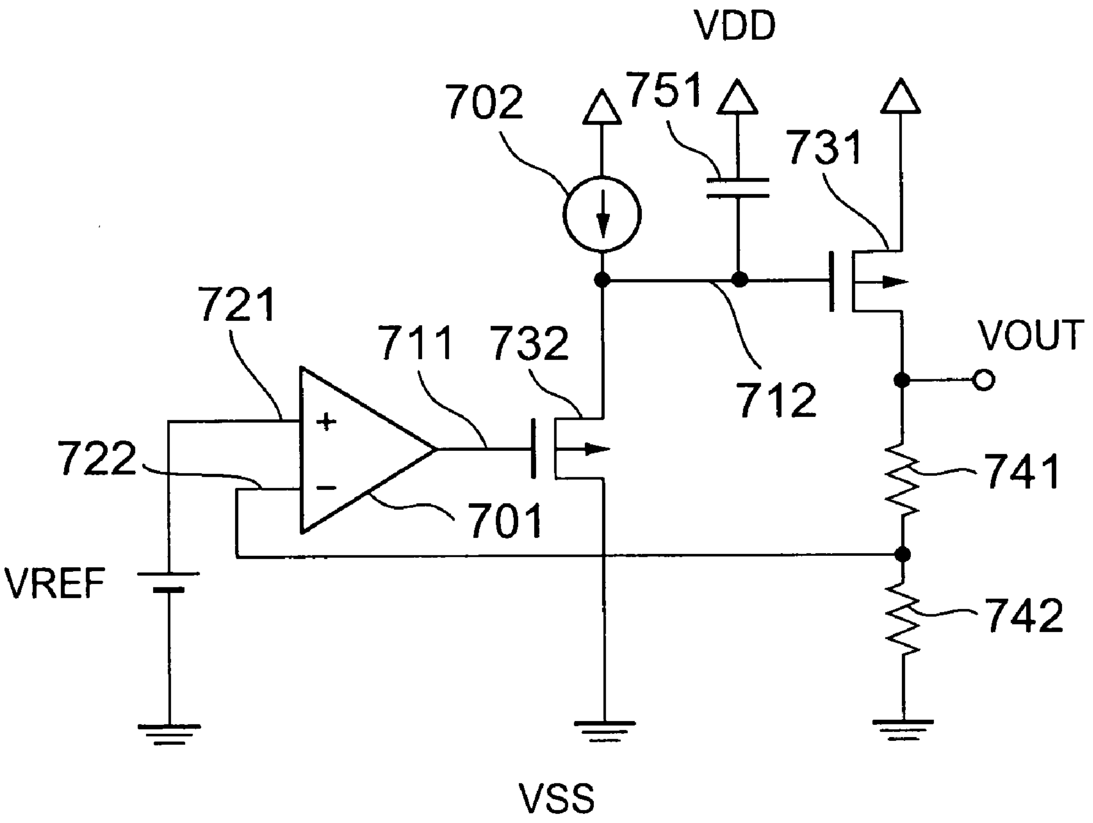
FIG. 7 is a circuit diagram showing a structure of a constant voltage outputting circuit according to a fifth embodiment of the present invention.

FIG. 6 shows a constant voltage outputting circuit according to a fourth embodiment of the present invention. In FIG. 6, a capacitor 651 is provided in the constant voltage outputting circuit in which unlike the constant voltage outputting circuit shown in FIG. 2, a constant current circuit 602 is connected to the power supply side. FIG. 7 shows a constant voltage outputting circuit according to a fifth embodiment of the present invention. In FIG. 7, a capacitor 751 is provided in the constant voltage outputting circuit in which unlike the constant voltage outputting circuit shown in FIG. 3, a constant current circuit 702 is connected to the power supply side. The circuit operations and the effects of the constant voltage outputting circuits of the fourth and fifth embodiments are the same as those of the constant voltage outputting circuits of the second and third embodiments.

What is claimed is:

1. A constant voltage outputting circuit, comprising:

a voltage division resistor that divides an output voltage at an output terminal and provides a divided voltage;

a reference voltage circuit that outputs a reference voltage;

a differential amplification circuit having one input terminal that receives the divided voltage and another input terminal that receives the reference voltage.

an output transistor connected between a power supply voltage and the output terminal for controlling the output voltage at the output terminal based on an output of the differential amplification circuit;

a capacitor connected between the power supply voltage and a gate terminal of the output transistor;

another transistor having a gate terminal connected to an output terminal of the differential amplification circuit; and a constant current circuit connected to a source-drain path of the other transistor, the gate terminal of the output transistor being connected to a node between the source-drain path and the constant current circuit.

2. A constant voltage outputting circuit according to claim 1; wherein each of the output transistor and the other transistor is a PMOS transistor.

3. A constant voltage outputting circuit according to claim 2; wherein the constant current circuit includes a PMOS depletion type transistor.

* * * * *